(No Model.)

F. J. SPRAGUE.
ELECTRIC RAILWAY SYSTEM.

No. 338,313.

Patented Mar. 23, 1886.

Fig. 1.

ATTEST:
E. E. Rowland
T. G. Greene Jr.

INVENTOR:
Frank J. Sprague (No Model.)  5 Sheets—Sheet 2.

F. J. SPRAGUE.
ELECTRIC RAILWAY SYSTEM.

No. 338,313.  Patented Mar. 23, 1886.

Fig. 2.

ATTEST:
E. C. Rowland
J. G. Greene Jr.

INVENTOR:
Frank J. Sprague
By Dyer & Seely
Attys (No Model.) 5 Sheets—Sheet 3.

F. J. SPRAGUE.
ELECTRIC RAILWAY SYSTEM.

No. 338,313. Patented Mar. 23, 1886.

(No Model.) 5 Sheets—Sheet 4.

F. J. SPRAGUE.
ELECTRIC RAILWAY SYSTEM.

No. 338,313. Patented Mar. 23, 1886.

ATTEST:
E. C. Rowland
T. G. Greene Jr.

INVENTOR:
Frank J. Sprague
By Dyer & Seely
Attys (No Model.) 5 Sheets—Sheet 5.

F. J. SPRAGUE.
ELECTRIC RAILWAY SYSTEM.

No. 338,313. Patented Mar. 23, 1886.

ATTEST:
INVENTOR:
Frank J. Sprague
By Dyer & Seely
Atty

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

ELECTRIC RAILWAY SYSTEM.

SPECIFICATION forming part of Letters Patent No. 338,313, dated March 23, 1886.

Application filed December 15, 1884. Serial No. 150,353. (No model.)

*To all whom it may concern:*

Be it known that I, FRANK J. SPRAGUE, of New York, in the county and State of New York, have invented a certain new and useful Improvement in Electric Railway Systems, of which the following is a specification.

The object of this invention is to provide a complete and efficient system of construction and operation of electric railways.

Said invention relates, mainly, to such a system as is set forth in my application Serial No. 58,356—that is, to one in which continuous main conductors are employed, connected at intervals with working-conductors usually divided into sections, from which working-conductors the motors derive current. The connections between the main and working conductors may be permanent, as in the application referred to, or they may be through electro-magnetic devices controlled by the position of a motor or train upon the sections.

A general description of the system which forms the subject of the present application applied to a double-track railway is as follows: I employ three main conductors of different potentials. One of these, called the "middle" or "balance" conductor, is connected to one side of the circuit of each track—that is to say, to the grounded rails, where these form the return, or to one of the working-conductors where a complete working-circuit is employed, such connections being either permanent or electro-magnetically controlled, as above mentioned. Another main conductor—the positive one, or that of highest potential—is connected permanently or electro-magnetically to a working-conductor of one track, say the down-track, while the other, being the negative conductor, or conductor of lowest potential, is connected with a working-conductor of the opposite or uptrack. The middle conductor is of an intermediate potential, being negative to one main conductor and positive to the other. The working-conductors are thus in two sets, each set connected between a pair of main conductors. The generators which supply current to the system are normally arranged in series of two generators or two groups of generators each, one terminal of a series being connected to the positive and the other to the negative main conductor, while the middle terminals, or those which are joined together, are both connected to the middle main conductor. This forms a divided source of electricity, with the middle main conductor connected at the point of division thereof. The motors on the tracks, each of which closes circuit between two working-conductors or between a working-conductor and the grounded rails of the track, are thus in two sets, one set on each track, and are connected in multiple series with a balance or compensating conductor between them, in which conductor current will normally flow according to the relative number of the motors in circuit on each side of it.

The supplying of a double track from a single main circuit, which is one of the features of the present invention, is shown and described but not claimed in my said application No. 58,356. It is evident that if the two tracks of the road should at any point diverge and run for a space at some distance apart, the main circuit may be divided, so as to follow the two tracks; but as the parts of the circuit would be connected together at two or more points it is considered as a single main circuit supplying both tracks. For the most economical working in an extended system, I consider it necessary to have two or more generating stations, (in each of which the generators are arranged as above set forth,) situated a considerable distance apart. At each generating-station I break the main conductors and bring the ends of the sections thus formed into the station, where they are connected with a switch-board or any other suitable switching devices, to which the supply-circuits from the generators are also connected, so that for testing, or in case of accident, any main conductor can be disconnected or changed independently of the others, as will be more fully hereinafter explained. Normally, however, the main conductors are continuous through the switch-boards. At various suitable points along the line of main conductors I provide additional switches, so that in case of accident, or if repairs are necessary at any point on the line, a section of the mains including such point may conveniently be cut out of circuit, and, if desired, temporary connections may be made from one switch to another around the break. In the supply-circuit from each generator I place a switch of such construction that by means of it the connections of any generator may be changed from one side of the system to the other—that is, so it can be made to supply either the up or down track. Thus any desired proportion of the power of a generating-station may be thrown upon one track, the balance going to the other in case at any time the traffic is heavier on one track than on the other; or the section of mains between any two generating-stations may be re-enforced on one side, while the next section is re-enforced on the other whenever the distribution of the motors on the tracks renders it desirable. Such differences of traffic often occur—for instance, on the elevated railroads in New York city, where at certain hours in the morning the down traffic is much heavier than the up, and at a corresponding time in the evening the reverse is the case. Differences in grade and leakage on the line may make similar demands. I provide, also, means for cutting out of circuit either or both sets of working-conductors or any section thereof; also, devices for changing the polarity of the working-conductors, so that any section or sections of working-conductors may be transferred from one side of the circuit to the other, which might at some time be made necessary by an accident to a working-conductor, such as the grounding of conductors of different potentials.

As set forth in the prior application already referred to, it is best to have the same potential existing at the terminals of all the sources of supply of the system. To permit of accomplishing this, I connect the stations by indicating-circuits joining the supply-conductors of like potential, whereby a rise or fall of potential at any station relative to the next is shown by an indicating device at the latter, and hence they can all readily be maintained alike, the generators being provided with suitable regulating devices. Thus the same potential exists at all parts of the line, and the motors work on a circuit of constant potential.

By the use of the system of three conductors great economy is attained in the amount of metal employed, for the motors being in series, as described, while the balance-wire makes them independently controllable-currents of high electro-motive force may be employed, whereby smaller conductors may be used.

The power above referred to of re-enforcing either side or any section of either side of the line is another important advantage of my system; for if in a section between two stations the work happens to be equally distributed between both sides, while on one adjacent section it is all on the uptrack, and on the other adjacent section on the downtrack, then the generators are readily connected to meet all these various demands. In the first-mentioned section little or no current will appear on the middle or balance conductor, while in the others said conductor will be very active and either the positive or the negative conductor will be less so. In case of a heavy ground on one of the main conductors of a section by means of the station switch-boards, one of the other main conductors can be made of the same polarity as the grounded one, in which case both tracks would work on the same side of the system, a sufficient number of generators being swung over to that side to supply both tracks. By means of the pole-changers for the working-conductor sections, if a ground appears on a working-section, causing such a fall of potential that a motor on such section is unable to proceed, the man in charge of the motor can change the polarity of the working-circuit, which clears it from its ground, and transferring it to the opposite side of the system raises the potential sufficiently high to operate the motor. If for any reason it is desired to block the motor on a section between two stations, this may be done by breaking the main conductors at those stations, or all the motors on a section can be brought very quickly and effectively to rest by disconnecting the main conductors from the system and then joining them together at their ends, (by means of the switch-boards,) which at once converts the motors into dynamo-electric generators working on a closed metallic circuit of low resistance, which promptly brakes the trains. The method of braking an electric railway motor by converting it into a generator is not claimed herein, being reserved for another application.

I have thus generally described the main features of the system. These with other features of less prominence are more particularly explained with reference to the accompanying drawings, in which—

Fig. 7 is a diagram of the principal circuits of the system.

Like letters refer to corresponding parts in all the figures.

The arrow-heads on lines representing circuit wires or conductors indicate direction of current. The arrows by the sides of the tracks show the direction of movement of motors or trains thereon.

A is one track or one side of the system, and B is the other. C C' are generating-stations. At one are generators D D', at the other generators D² D³. E E', &c., are motors running on the tracks. In the system shown in Figs. 1, 2, and 3 the main or traffic rails $a$ $a$ do not form part of the circuit. The motors derive current from the working-conductors $b$ $b'$ or $b^2$ $b^3$, each of which forms one side of the circuit. These working-conductors may be central or intermediate rails, laid on the ties, as shown, or they may be placed on poles by the side of the track supported overhead, or placed in trenches in the road-bed, or arranged in any other suitable or convenient manner. In all cases, however, they are divided into sections, as shown, in this case by short insulating-sections $d$ $d$. The main conductors $p$, $n$, and $c$ extend along the line between the tracks. Normally $p$ is the positive, $n$ the negative, and $c$ the balance conductor. This is the case in Fig. 1. The main and working conductors are connected together by branch conductors—on the A side of the system by conductors $f$ $f'$, and on the B side by conductors $g$ $g'$. These connections may be permanent, as in the prior application already referred to, or, as shown, the connections may be through electro-magnetic devices controlled by the movement of the motors or trains. The general course of the current, then, is as follows in Fig. 1: From the generators to main conductor $p$, then to working-conductor $b^2$ by branch conductors $f$, through motors E³ E⁴ E⁵ to working-conductor $b^3$, through conductors $f'$ and $g'$ to working-conductor $b'$, through motors E E' E² to working-conductor $b$, by branch conductors $g$ to main conductor $n$, and so back to the source of supply.

Figure 1:
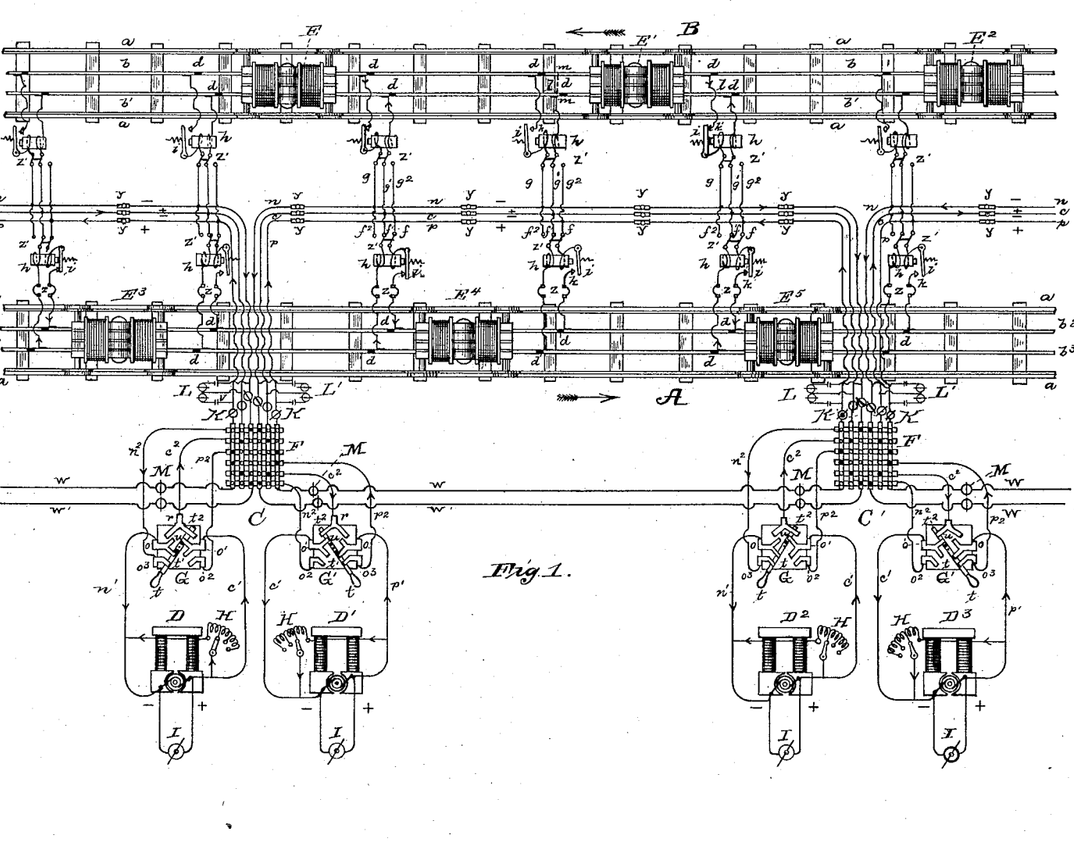
Figure 1 is a plan view and diagram of an electric railway system embodying my invention. In this view the motors are equally distributed between the two sides of the system.

The particular arrangement of electro-magnetic devices for controlling the working-circuits herein set forth forms no part of the invention included in this application. It is applicable as well to a two-conductor system as to the three-conductor system herein set forth, and I intend to make it the subject of another application for Letters Patent. Briefly, it may be described as follows, taking the motor E' on track B as an illustration: The branch conductors $g$ $g'$ which supply the section on which this motor is, are both wound upon the core of an electro-magnet, $h$. Conductor $g'$ is a permanently continuous connection, while conductor $g$ includes the pivoted spring-retracted armature $i$, which makes and breaks circuit at $k$. The ends of the working-conductors of the section overlap, as seen at $l$. When the motor E' reaches the end of its section and crosses the first insulating-section in its path, (assuming the position shown by the dotted lines $m$ $m$,) it transfers one of its contacts from one permanently-closed working-conductor to a similar conductor of the next section, but without breaking the continuity of the circuit. By this transference the electro-magnet in the circuit of the latter permanent conductor is energized and attracts its armature, and the circuit is closed to the other working-conductor, thus preparing the section for the entrance of the train, though as yet no current passes in this circuit. The switch of the section which the train is leaving is still closed, and is kept closed by the effect of those magnet-coils which are in the electrically-closed conductor. I prefer to use in addition an electrically-controlled locking device for the circuit-closer, which, however, I do not consider it necessary to fully set forth in this application. The motor now moves on until it is fully on the advanced section, when circuit is closed to both working-conductors of that section, and broken in the electrically-controlled conductor of the last section, releasing the armature of the magnet thereof. The details and advantages of this arrangement will be more completely set forth in the proposed application especially relating thereto. Each working-section is provided with such a controlling device, as shown. At each generating-station along the line the main conductors $p$, $n$, and $c$ are brought into the station from both directions and connected to a switch-board, F.

The arrangements within a generating-station are as follows—for instance, in station C: The generators D D' are connected in series. Each of these may be a group of generators connected in series or in multiple arc. The supply-wires from each generator are brought to a switch, G or G'. These switches are to enable any generator to be thrown from one side of the system to the other. The wires $n'$ and $c'$ from generator D extend, respectively, to the forked contact-plates $o$ and $o'$ on the switch of that generator. From contacts $o^2$ $o^3$ extend the positive and negative supply-conductors $p^2$ $n^2$, and from central contact, $r$, extends the compensating or balance wire $c^2$. The switch-lever $t$ has metal surfaces $t'$ $t^2$ and an insulating-section, $u$. Another similar switch is connected in the same way with generator D'. The conductors $p^2$, $n^2$, and $c^2$ are connected through the switch-board F, as shown, with the continuous main conductors. In the position of the switch-levers shown the generators are, as stated, in series, the course of the current throughout the series circuit being from generator D' by wire $p'$, contact $o$ of switch G', lever-blade $t'$, and contact $o^3$ of same switch to wire $p^2$, and to the switch-board, then to continuous main conductor $p$, as shown by the inserted plugs through the branch conductors, working-conductors, and motors, as before explained, to main conductor $n$, to the switch-board, to wire $n^2$, leading to contact $o^3$ of switch G, to lever-blade $t'$, contact $o$, and wire $n'$ to generator D. From opposite terminal of generator D by wire $c'$ to contact $o'$ of switch G, switch-blade $t^2$, and contact $r$ of said switch to wire $c^2$ and the switch-board; on the opposite side of switch-board by wire $c^2$ to contacts $r$, $t^2$, and $o'$ of switch G', and wire $c'$ to the negative terminal of generator D'.

Connected with the conductors $c^2$ $c^2$ at the switch-board is the main balance conductor $c$, whose connection is thus between the generators of the series. Each generator is provided with suitable means for regulating its electro-motive force. Such means, preferably, is an adjustable resistance, H, in the field-circuit of the generator. Each generator, also, is preferably provided with a galvanometer, I, or other suitable indicator of its electro-motive force.

In each conductor $p$ $n$ $c$ which enters the station is placed a galvanometer or other indicator, K. These indicators show the direction and amount of current in each conductor.

At each station, in derived circuits from the main conductors, are electrical indicators L or L'. Each has a switch at $v$. If the engineer at station C wishes to know whether the main circuit of his section has been broken at station C', he closes circuit to indicators L', which then indicates whether any current is passing on the section, and that end of the line can then, also, be thrown off, if necessary. The station C' is similarly equipped and arranged, and the description of the circuits just given applies as well to this station as to station C. Any desired number of similar generating-stations are connected in the same manner along the line, according to the distance and the power required. Between the stations extend indicating-circuits $w$ $w'$. Wire $w$ connects positive and $w'$ negative conductors. In each is a galvanometer or other indicator, M. These indicate the relative potentials at the two stations, and thus they can be maintained by regulating the generators constantly the same.

Along the line of the main conductors, at convenient points, are placed additional switches, $y$ $y$. Those shown are ordinary plug-switches. These may be contained in suitable junction-boxes, into which the conductors are run. They are used to cut out any part of a main-conductor section on which an accident occurs or on which repairs may be necessary. Temporary wires may, if desired, be run from one switch to the next around the break.

Safety-catches $z$ $z$ are preferably placed in all the branch conductors to protect the system in case of a short circuit occurring.

In Fig. 1, on account of lack of space, the safety-catches are shown on only one side of the system.

The branch conductors have pole-changing switches $z'$. By shifting a switch from $g$ $g'$ to $g'$ $g^2$ or from $f$ $f'$ to $f'$ $f^2$ the connections of any working-conductor section are changed from one side of the system to another. Thus in case of a ground on a working-conductor of a section, so that a motor on that section does not receive current sufficient to propel it, the section may be thrown onto the other side, which will clear it from its ground and allow it to proceed.

Figure 2:
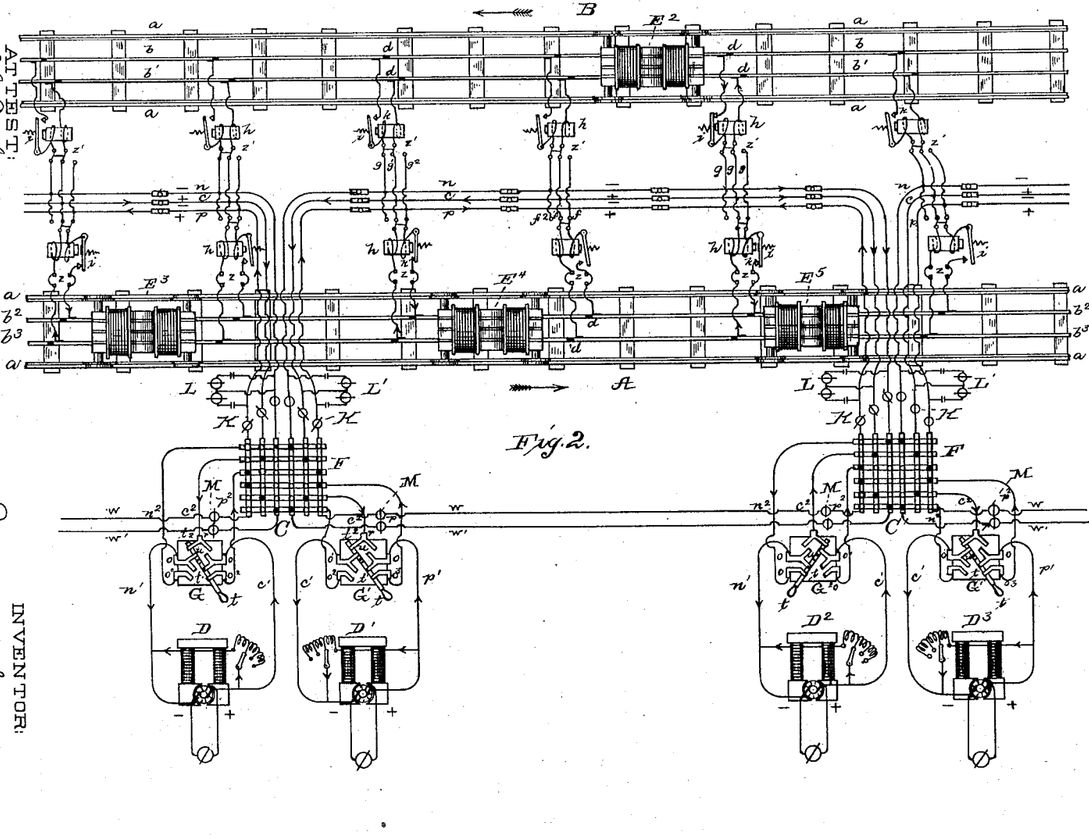
Fig. 2 is a similar view of the same system, but in this view the conditions are changed, and more work is being done on one side than on the other.

Referring now to Fig. 2, in which the circuits and connections are the same as those in Fig. 1, the working conditions are changed. On track B there is only one motor, $E^2$, while on track A three motors are running. Evidently track A now requires more power than track B. To meet this difference, the pivoted lever $t$ of switch G at station C is thrown over to the other side of the switch. This connects generator D to the A side of the system, bringing D and D' into multiple arc relation to each other on that side, which is then supplied by generators D, D', and $D^3$, while generator $D^2$ supplies by itself the other side, furnishing sufficient current for the single motor there in circuit. The connections from generators D D' now are from positive terminal of D', by wire $p'$, to switch G', wire $p^2$ to switch-board, then to main conductor $p$, through the branches, working-conductors, and motors on A side track to main conductor $c$, thence to the switch-board and to conductor $c^2$ leading to switch G', and by $c'$ to the negative terminal of the generator. Generator D is similarly connected. Its wires $c'$ and $p^2$ through the switch connect it with main conductor $p$, and its wires $n'$ and $c^2$ connect it with conductor $c$. The generators are thus in multiple arc, as previously stated. The connections of $D^2$ and $D^3$ are precisely the same as those of D D', described with reference to Fig. 1.

Figure 3:
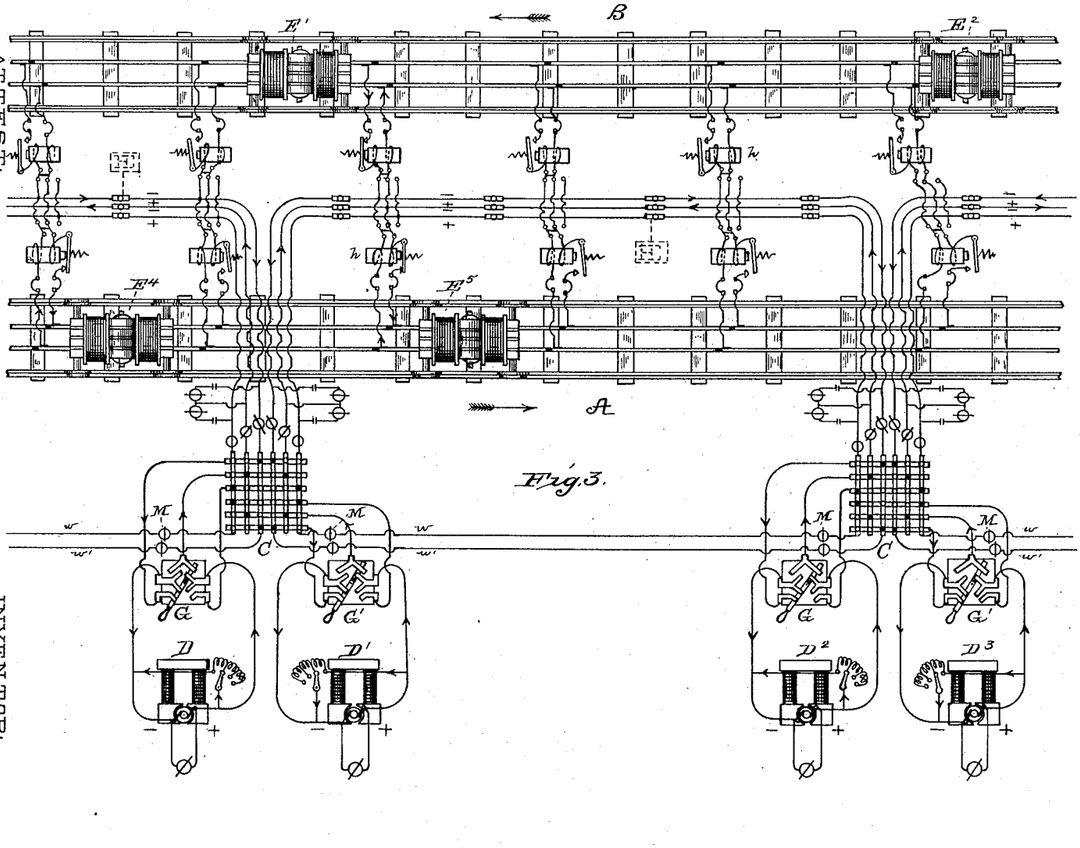
Fig. 3 is a similar view of the system. All the generators are here working on the same side, and there are other changed conditions, which will be explained.

Fig. 3 shows the same system under still different circumstances. The motors on the two sides are the same in number, but by accident leaks or ground-connections have occurred on main conductors $p$ and $n$. To prevent the loss of current which would result from this, the A side, both generators and motors, is cut entirely out of circuit, and the whole system works on the B side. This is done by bringing all the switch-lever handles to the left, whereby all the generators are placed in multiple arc between conductors $n$ and $c$, and reversing all the pole-changers in the branch conductors leading to the A side, which, as seen, connects all the A working-sections between $n$ and $c$, or, in other words, on the B side. The A side being out of circuit, there is no leakage from the ground-connections.

Instead of using the switches G G', the A side may be plugged out at the switch-boards.

If any one main-conductor section requires more current on one side than on the other, while the other sections are equally balanced, or if a leak occurs between opposite conductors of the same section, that section may be disconnected at the switch-boards from the adjacent sections, and generators connected to it, as required, to meet its particular conditions. In this way each side of each section is made to receive the amount of current required.

Figure 4:
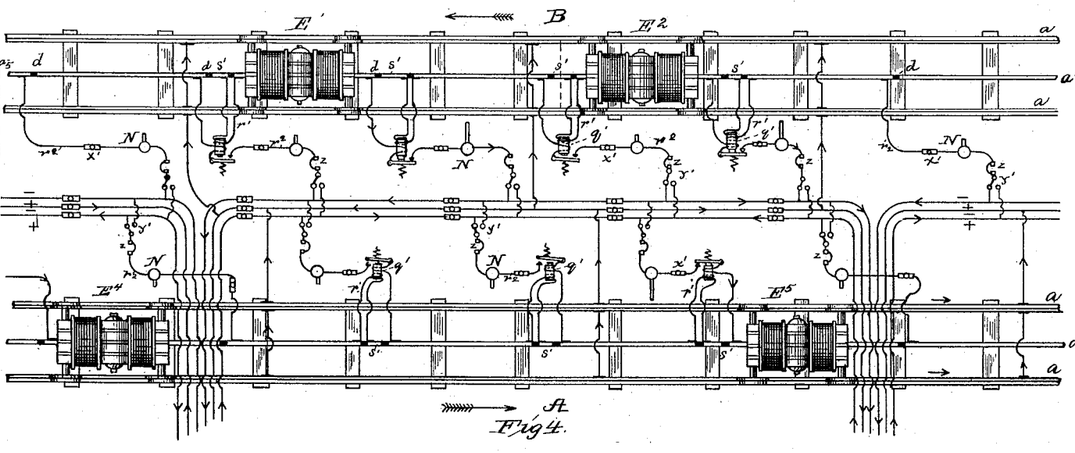
Fig. 4 illustrates a different arrangement of working and branch conductors.

Fig. 4 introduces some modifications and some additional devices, which latter may be used in connection with the arrangements already described. The generating-stations are not shown in this figure. Instead of using two working-conductors on each side of the system, there is only one, $a^4$ or $a^5$, on each side, the main rails of the track with the ground form one side of the working-circuit, and the branch conductors from the middle main conductor, $c$, are connected to the two rails on both sides. Otherwise the arrangement of the principal circuits is the same as already set forth. A different electro-magnetic device for controlling the branch circuits is shown in this figure. A short section, $s'$, at the end of each working-conductor is insulated from the rest, and a conductor, $r'$, including part of the coils of electro-magnet $q'$, is connected on both sides of the break. The remainder of the magnet-coils are included in the branch conductor $r^2$, which includes also the pivoted armature. When the motor—for instance, $E^2$—is on a section, as shown, circuit is closed through this magnet, and the section is supplied with current; but when the motor reaches the short insulated section, as shown by the dotted line, the circuit of conductor $r'$ thereat is closed, so that the magnet $q'$ of the advanced section is energized and closes the circuit of that section before the motor enters upon it. After the motor enters the section conductor $r^2$ keeps the magnet energized and the circuit closed. It is of course understood that the length of the motors relative to the tracks is much exaggerated in all the figures of the drawings.

N N are electrically-controlled signaling devices, such as are set forth in my application No. 58,356. They indicate the presence of a motor or train on a section, and evidently they can be used as well with the arrangement of circuits of Figs. 1, 2, and 3 as with that in Fig. 4.

Instead of the double switch for the branch conductors previously described, a single-arm switch, $y'$, is used to change the branch conductors from one side to the other of the system, the connections to the rails $a$ $a$ being always the same. Additional switches, $x'$ $x'$, may be placed in the branch conductors for cutting working-sections entirely out of circuit.

Figure 5:
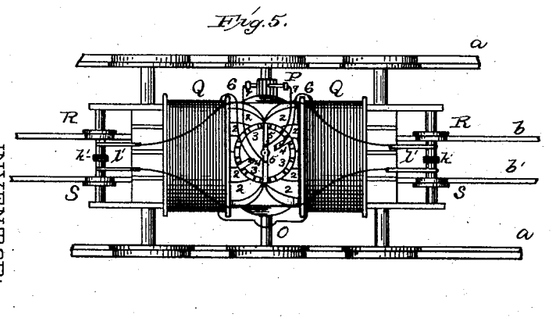
Figs. 5 and 6 are views of motors employed in the system.
Figure 6:
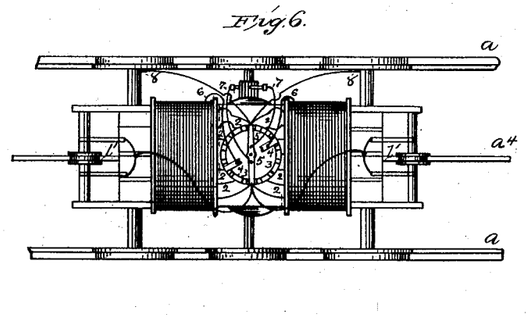

By reason of lack of space the working-contacts and the electrical connections of the motors are not shown in the figures heretofore described. They are illustrated in Figs. 5 and 6. Fig. 5 shows a motor used with two insulated working-conductors, $b$ $b'$.

Contact-rollers R R on one side and S S on the other are the terminals taking current from the working-conductors and delivering it to the motor through springs or brushes $t'$ $t'$, resting on the axles, each of which has an interposed section of insulation, $k'$.

For regulating the mechanical effects of the motor, each limb of its field-magnet Q Q is wound in sections connected together, and from the bights of the sections connections 2 2 are made to blocks 3 3 of a circular commutator. This commutator has two pairs of pivoted arms, 4 4 and 5 5. To arms 4 4 are connected the terminals 6 6 of an independent series of field-coils, which are thus in a shunt between the sectional ranges of main field-coils. Part of the arms 4 4 are broken away in the drawings for clearness of illustration. It is evident that by moving the arms 4 4 on the contact-blocks 3 3 the magnetizing effect of the independent coil 6 6 is varied or reversed, whereby the strength of the field-magnet and the mechanical effects in the motor may be regulated as set forth in my application Serial No. 121,487. The armature-terminals 7 7— the field-magnet and armature being in shunt relation—are connected in a similar manner to commutator-arms 5 5, whereby the armature-current may be varied when necessary.

In Fig. 6 is a motor used with a single working-conductor, $a^4$, the main rails of the track forming the other side of the circuit. Here there is one contact-roller, $l'$, at each end of the motor, the other circuit-terminal being the running wheels 8 8.

Regulating means are provided, as above described.

Where other forms of working-conductors are used, corresponding changes are of course made in the form and situation of the working-contacts of the motors.

The principal circuits of the system are illustrated in Fig. 7, wherein, so that such circuits may be readily traced, all the switch-boards, switches, and like appliances are omitted, the main conductors are shown as continuous, and only one generating-station is shown.

I do not claim herein the following features, they being claimed in a division of this application, viz: supplying two or more sets of working-conductors from the same source of supply substantially in the manner above set forth, the use of the third or compensating-conductor and the divided source of supply with the various devices and arrangements peculiar to a system employing these elements, the generating-stations all having the same difference of potential at the points of connection with the line and the indicating devices for permitting this to be accomplished, and the switch for the branch conductors shown in Fig. 4.

What I claim as my invention is—

1. In an electric railway system, the combination of working-conductors from which the motors derive current, and main conductors extending along the line and connected at intervals with said working-conductors, said main conductors being divided into sections and provided with means for connecting and disconnecting said sections, substantially as set forth.

2. In an electric railway system, the combination of normally-continuous main conductors, two or more generating-stations, and a switch-board at each station to which the said main conductors and the supply-conductors of the generators are connected, whereby the continuity and connections of said main conductors may be broken or changed, substantially as set forth.

3. In an electric railway system, the combination, with the main conductors and the break-circuit switches at the generating-stations, of the indicators connected with said conductors at each station to indicate the breaking of the circuit at the next station, substantially as set forth.

This specification signed and witnessed this 12th day of December, 1884.

FRANK J. SPRAGUE.

Witnesses:
E. C. ROWLAND,
THOS. G. GREENE, Jr.